US007776121B2

(12) United States Patent
Yun et al.

(10) Patent No.: US 7,776,121 B2
(45) Date of Patent: Aug. 17, 2010

(54) DUST COLLECTING UNIT OF VACUUM CLEANER

(75) Inventors: Chang Ho Yun, Changwon-si (KR); Gun Ho Ha, Busan (KR); Jin Young Kim, Busan (KR); Chang Hoon Lee, Changwon-si (KR); Jin Wook Seo, Busan (KR)

(73) Assignee: LG Electronics Inc., Seoul (KR)

( * ) Notice: Subject to any disclaimer, the term of this patent is extended or adjusted under 35 U.S.C. 154(b) by 600 days.

(21) Appl. No.: 11/730,923

(22) Filed: Apr. 4, 2007

(65) Prior Publication Data

US 2008/0010957 A1 Jan. 17, 2008

(30) Foreign Application Priority Data

Apr. 4, 2006 (KR) ...................... 10-2006-0030630

(51) Int. Cl.
*B01D 45/12* (2006.01)

(52) U.S. Cl. .......................... 55/426; 55/429; 55/459.1; 55/460; 55/DIG. 3

(58) Field of Classification Search ................... 55/392, 55/399, 426, 429, 459.1, 460, DIG. 3
See application file for complete search history.

(56) References Cited

U.S. PATENT DOCUMENTS

| | | | | |
|---|---|---|---|---|
| 6,350,292 | B1 | 2/2002 | Lee et al. | |
| 7,544,224 | B2 * | 6/2009 | Tanner et al. | 55/337 |
| 2002/0011053 | A1 | 1/2002 | Oh | |
| 2005/0138763 | A1 | 6/2005 | Tanner et al. | |

FOREIGN PATENT DOCUMENTS

| | | |
|---|---|---|
| EP | 1042981 | 10/2000 |
| GB | 2369290 | 5/2002 |
| JP | 2002-172076 | 6/2002 |
| JP | 2002-291665 | 10/2002 |
| JP | 2003-019446 | 1/2003 |
| JP | 2003-24253 | 1/2003 |
| JP | 2003-112082 | 4/2003 |
| JP | 2005-185838 | 7/2005 |
| KR | 2002-0091519 | 12/2002 |
| KR | 1020050030609 | 3/2005 |
| RU | 2003132291 | 4/2005 |

OTHER PUBLICATIONS

Chinese Office Action dated Mar. 27, 2009 with translation.
European Search Report dated Jul. 29, 2009.
Japanese Office Action dated Jul. 21, 2009.

* cited by examiner

*Primary Examiner*—Robert A Hopkins
(74) *Attorney, Agent, or Firm*—KED & Associates, LLP

(57) ABSTRACT

Provided is a dust collector of a vacuum cleaner. The dust collector includes a dust separating unit forming a separation space for separating dust from air, a collector body forming a dust storage for storing the dust separated in the dust separating unit, and a dust guide passage connecting the separation space to the dust storage and guiding the separated dust to be discharged from the separation space in a tangential direction.

21 Claims, 10 Drawing Sheets

DUST COLLECTING UNIT OF VACUUM CLEANER

BACKGROUND OF THE INVENTION

1. Field of the Invention

The present invention relates to a dust collector of a vacuum cleaner, and more particularly, to a dust collector of a vacuum cleaner, in which dust can be collected more efficiently and a backward flow of collected dust can be prevented.

2. Description of the Related Art

Generally, a vacuum cleaner sucks air containing dust using a negative pressure generated by a suction motor installed in a main body, and then dust is separated from the air in the main body.

Vacuum cleaners can be divided into a canister type vacuum cleaner and an upright type vacuum cleaner. A canister type vacuum cleaner includes a separate nozzle used for sucking air containing dust from a surface to be cleaned, a main body, and a connection tube connecting the separate nozzle to the main body. On the hand, an upright type vacuum cleaner includes a nozzle formed integral with a main body.

Meanwhile, a vacuum cleaner includes a dust collector for collecting dust from sucked air. The dust collector includes a suction tube through which air containing dust is sucked, a dust collector vessel forming a dust storage, a dust separating unit for separating dust from the air, a discharge hole for discharging air from the dust separating unit, and a filter for filtering out dust.

In detail, the dust collector vessel is divided by a barrier wall into a space for the dust separating unit and a space for the dust storage. A dust discharge hole is formed in the barrier wall to discharge dust from the dust separating unit to the dust storage.

An operation of the dust collector will now be described in brief. When a suction motor is powered on, outside air containing dust is sucked into the dust collector vessel. Then, dust is separated from the air in the dust separating unit. After that, the air is discharged through the discharge hole, and the separated dust is sent to the dust storage formed in a lower portion of the dust collector vessel through the dust discharge hole.

However, since the dust is sent to the dust storage through the dust discharge hole formed in the barrier wall by gravity, relatively light dust particles remain in the dust separating unit although heavy dust particles are easily moved down to the dust storage by gravity.

In other words, when dust is collected in the dust storage, the dust is moved in a direction different from the direction along which the dust is moved while it is separated from air. Therefore, the dust separated from the air cannot be easily moved down to the dust storage.

Furthermore, since light dust particles remain in the dust separating unit, filter installed in the dust separating unit is contaminated by the light dust. In this case, air cannot easily pass through the filter, and thus dust is not efficiently removed from the air.

In addition, since dust separated from air is sent from the dust separating unit to the dust storage through the dust discharge hole formed in the barrier wall by gravity, dust stored in the dust storage can be blown off and moved back to the dust separating unit by swirling air during a dust separating process.

Moreover, the dust moved back to the separating unit decreases the efficiency of the dust separating unit.

SUMMARY OF THE INVENTION

Accordingly, the present invention is directed to a dust collector of a vacuum cleaner that substantially obviates one or more problems due to limitations and disadvantages of the related art.

An object of the present invention is to provide a dust collector of a vacuum cleaner, in which dust separated from air in a dust separating unit is easily moved down to a dust storage.

Another object of the present invention is to provide a dust collector of a vacuum cleaner, in which dust stored in a dust storage is prevented from being scattered back to a dust separating unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a dust collector of a vacuum cleaner, the dust collector including: a dust separating unit forming a separation space for separating dust from air; a collector body forming a dust storage for storing the dust separated in the dust separating unit; and a dust guide passage connecting the separation space to the dust storage and guiding the separated dust to be discharged from the separation space in a tangential direction.

In another aspect of the present invention, there is provided a dust collector of a vacuum cleaner, the dust collector including: a dust separating unit forming a separation space for separating dust from air; a collector body accommodating the dust separating unit and forming a dust storage for storing the dust separated in the separation space; and a dust guide passage formed at an outside of the separation space for guiding the separated dust to the dust storage.

In a further another aspect of the present invention, there is provided a dust collector of a vacuum cleaner, the dust collector including: a collector body in which a dust separating unit is formed for separating dust from air and a dust storage is formed for storing the separated dust; a barrier wall dividing the collector body into the dust separating unit and the dust storage; and a dust guide passage formed outside the dust separating unit for guiding the dust separated in the dust separating unit to the dust storage.

According to the present invention, the dust guide passage guides dust separated from air to be discharged from the dust separating unit in a tangential direction of the dust separating unit, so that the efficiency of the dust separating unit can be improved.

That is, separated dust is discharged from the dust separating unit in the same direction as the swirling direction of air in the dust separating unit. Thus, relatively light dust particles as well as heave dust particles can be easily discharged from the dust separating unit. As a result, no dust remains in the dust separating unit.

Since light dust particles do not remain in the dust separating unit, a filter member disposed in the dust separating unit is not contaminated by the light dust. Thus, air can smoothly pass through penetration holes of the filter member, and therefore dust separating efficiency increases.

In addition, the dust guide passage is formed outside of the dust separating unit, and the movement direction of dust is changed in the dust guide passage, so that dust stored in the dust storage can be prevented from scattering back to the dust separating unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
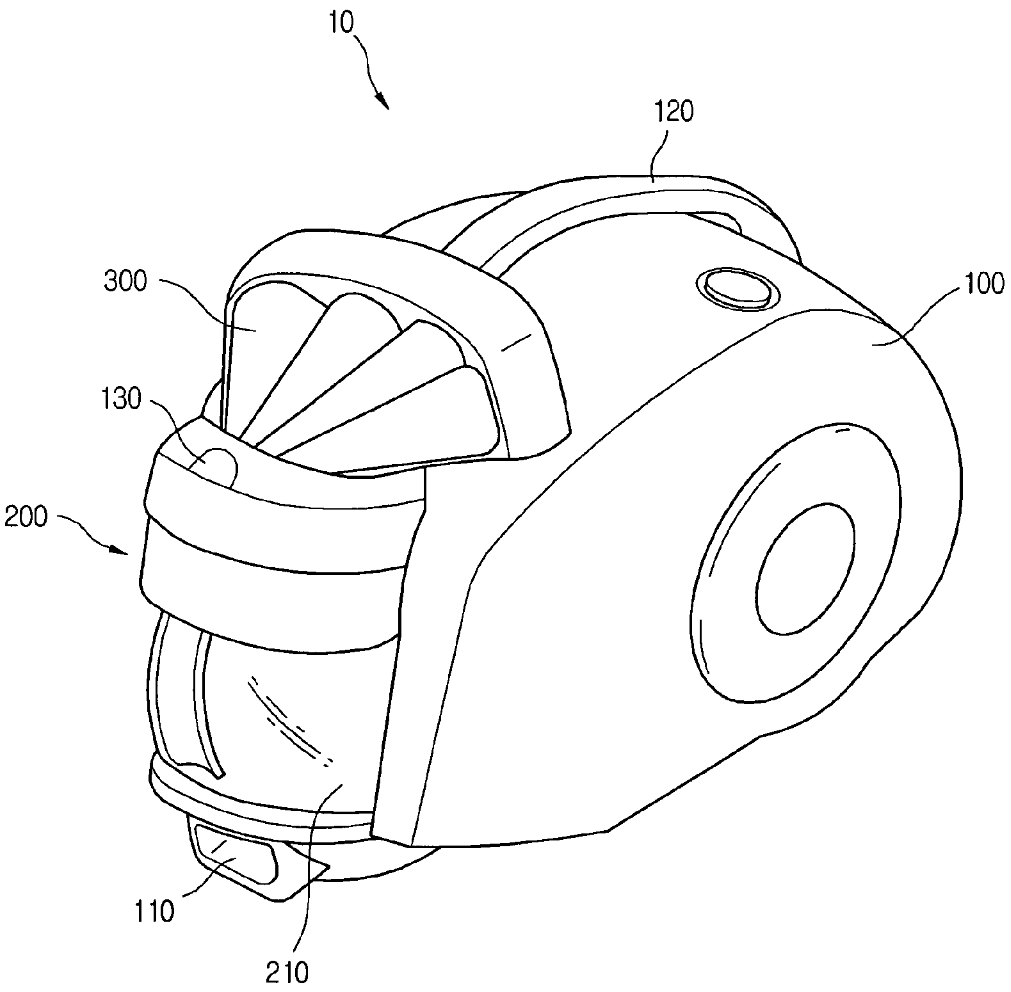
FIG. 1 is a perspective view illustrating a vacuum cleaner according to an embodiment of the present invention.

FIG. 1 is a perspective view illustrating a vacuum cleaner 10 according to an embodiment of the present invention.

Referring to FIG. 1, the vacuum cleaner 10 of the current embodiment includes a main body 100 and a dust collector 200 detachably installed to the main body 100.

The vacuum cleaner 10 further includes a suction nozzle (not shown) through which air containing dust is introduced into the vacuum cleaner 10, and a connection tube connecting the suction nozzle to the main body 100.

In the current embodiment, the suction nozzle and the connection tube have the same structure as those of the related art. Thus, descriptions thereof will be omitted.

In detail, the main body 100 includes a suction port 110 receiving air sucked through the suction nozzle. The main body 100 further includes a discharge port (not shown) at a side portion to discharge air from the main body after dust is removed from the air. A handle 120 is formed on an upper portion of the main body 100 for carrying the main body 100.

The dust collector 200 is detachably installed to a front portion of the main body 100. A coupling unit 130 is formed at a front upper portion of the main body 100 to detachably install the dust collector 200 to the main body 100.

In the dust collector 200, dust is removed from air by a cyclone mechanism. For this purpose, the dust collector 200 includes a first cyclone unit (described later) generating a cyclone flow, and a collector body 210 in which a dust storage is formed to received dust separated from air by the first cyclone unit.

After dust is first separated from air by the first cyclone unit, dust is secondly separated from the air by a second cyclone unit 300 included in the main body 100.

In detail, the dust collector 200 is detachably installed to the main body 100 as described above. In this state, the second cyclone unit 300 communicates with the dust collector 200.

The second cyclone unit 300 includes a plurality of cone-shaped cyclone parts forming a fan shape. The second cyclone unit 300 is formed at a front upper portion of the main body.

A communication passage is formed in the main body 100 for connecting the dust collector 200 and the second cyclone unit 300. Dust separated from air by the second cyclone unit 300 is stored in the dust collector 200.

For this, the collector body 210 includes a separate dust storage for storing dust separated from air by the second cyclone unit 300.

That is, the collector body 210 includes two dust storage (hereinafter, referred to as first and second dust storages, respectively). The first dust storage stores dust separated by the first cyclone unit, and the second dust storage stores dust separated by the second cyclone unit 300. The first and second dust storages will be described later in more detail with reference to the accompanying drawing.

An operation of the vacuum cleaner 10 will now be described.

When the vacuum cleaner 10 is powered on and the main body 100 is operated, the suction motor included in the main body 100 generates a suction force. Then, air containing dust is introduced into the dust collector 200 through the suction nozzle, the connection tube, and a passage formed in the main body 100.

In the dust collector 200, dust is first separated from the air by the first cyclone unit. The dust separated from the air is stored in the collector body 210, and the remaining air is discharged from the dust collector 200 into the main body 100. In the main body 100, the air is introduced into the second cyclone unit 300 through a connection passage.

In the second cyclone unit 300, dust is second separated from the air, and the dust is sent and stored to the dust collector 200. Then, the remaining air is guided along a predetermined passage formed in the main body 100 and is discharged to the outside of the main body 100 through the discharge port.

Hereinafter, the dust collector dust collector 200 will be described in detail according to an embodiment of the present invention.

Figure 2:
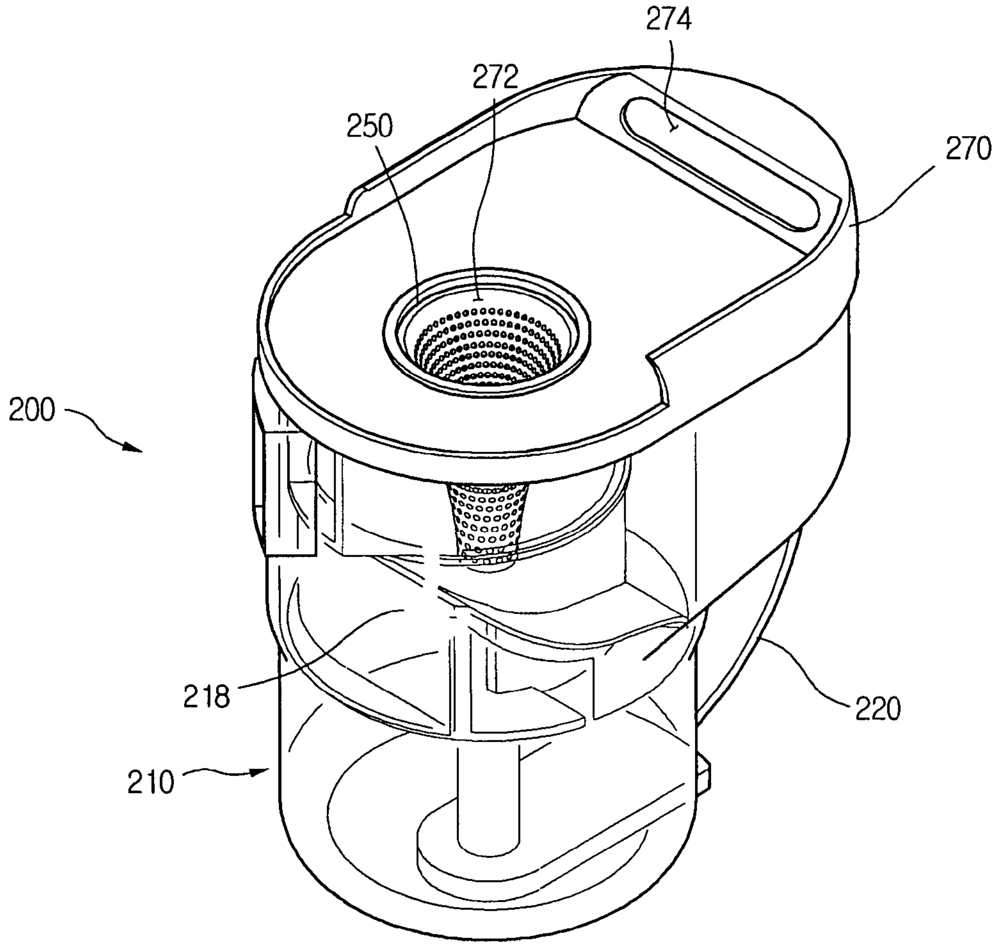
FIG. 2 is a perspective view illustrating a dust collector according to an embodiment of the present invention.
Figure 3:
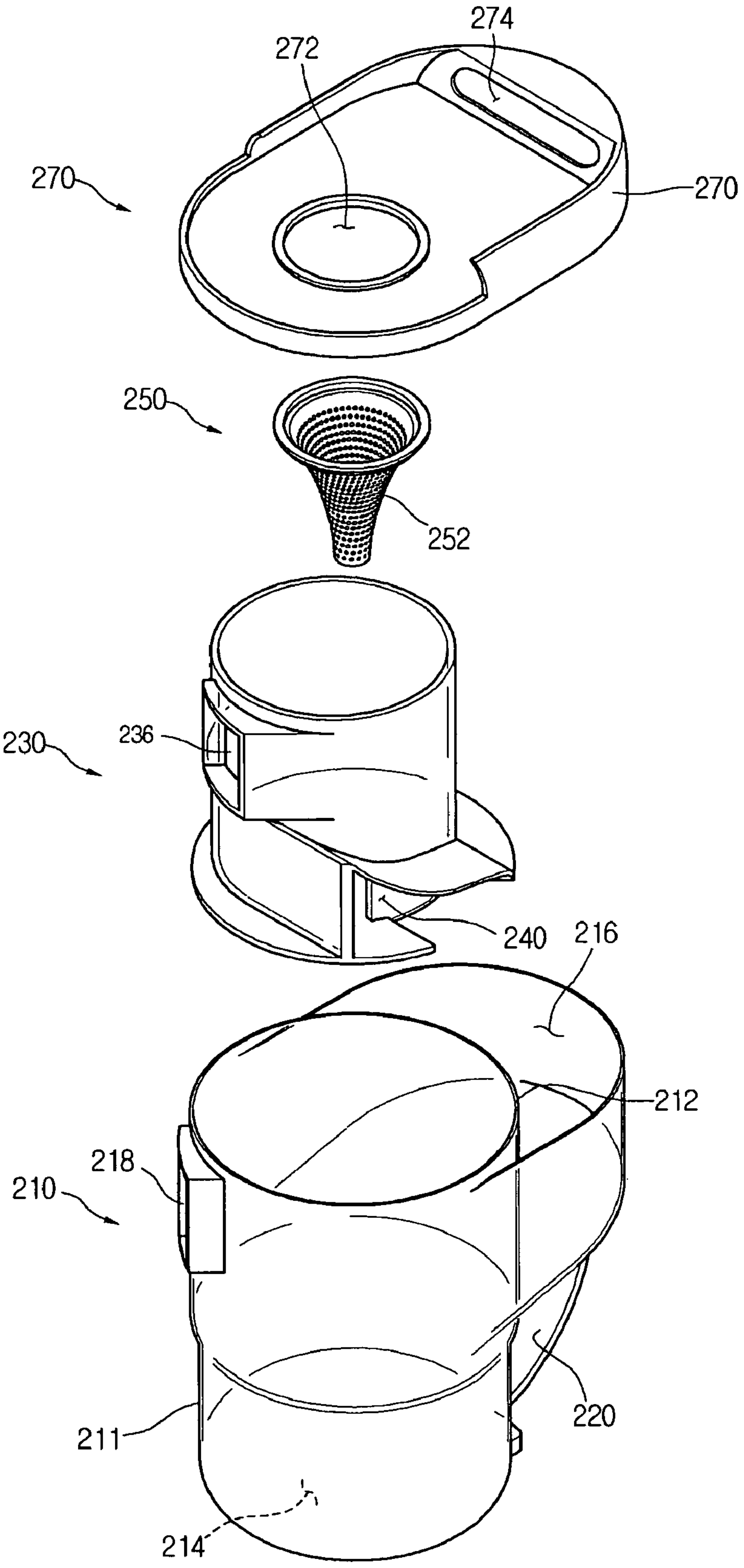
FIG. 3 is an exploded perspective view of the dust collector of FIG. 2.
Figure 4:
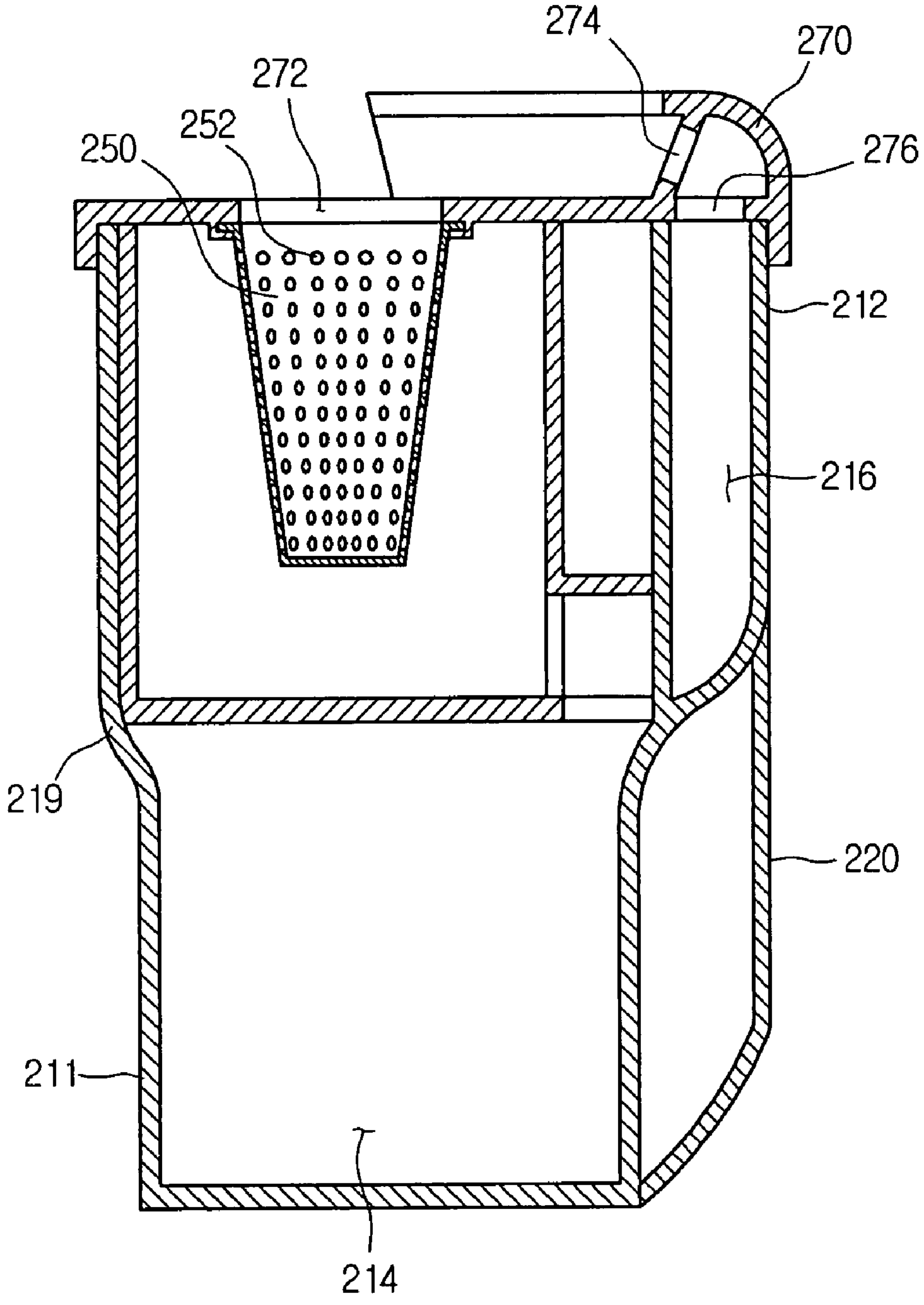
FIG. 4 is a cross sectional view of the dust collector of FIG. 2.

FIG. 2 is a perspective view illustrating the dust collector 200 according to an embodiment of the present invention, and FIG. 3 is an exploded perspective view of the dust collector 200, and FIG. 4 is a cross sectional view of the dust collector 200.

Referring to FIGS. 2 through 4, the dust collector 200 according to the current embodiment includes a collector body 210, a dust separating unit 230, and a cover member 270. The collector body 210 forms the exterior of the dust collector 200. The dust separating unit 230 can be detachably coupled to the collector body 210 and formed with a first cyclone unit 231 (refer to FIG. 5). The cover member 270 selectively opens and closes a top portion of the collector body 210.

In detail, approximately, the collector body 210 has a cylindrical shape. A dust storage is formed in the collector body 210 to store dust separated from air.

The dust storage includes a first storage 214 for storing dust separated from air by the first cyclone unit 231, and a second storage 216 for storing dust separated from air by the second cyclone unit 300 of the main body 100.

The collector body 210 includes a first wall 211 forming the first storage 214 and a second wall 212 forming the second storage 216 together with the first wall 211. That is, the second wall 212 is formed around a portion of the first wall 211. The dust separating unit 230 is disposed in the first dust storage 214.

The first wall 211 includes a vent portion 219 formed along a circumference to support a lower end of the dust separating unit 230. Therefore, based on the vent portion 219, an upper portion of the first storage 214 is larger than a lower portion of the first storage 214.

A suction inlet 218 is formed in the collector body 210 to allow an inflow of air containing dust.

The collector body 210 includes an opened top portion, so that dust collect in the collector body 210 can be easily by turning the collector body 210 upside down. The cover member 270 is detachably coupled to the collector body 210 to close the opened top portion of the collector body 210.

As described above, the dust separating unit 230 is accommodated in the first dust storage 214. The dust separating unit 230 separates dust from sucked air using a cyclone flow.

The dust separating unit 230 includes the first cyclone unit 231 and a dust guide passage 240. The first cyclone unit 231 has a cylindrical shape and separates dust from sucked air using a cyclone flow, and the dust separated in the first cyclone unit 231 is guided along the dust guide passage 240 to the first dust storage 214.

The dust separating unit 230 includes a suction inlet 236 corresponding to the suction inlet 218 of the collector body 210. When the dust separating unit 230 is disposed in the collector body 210, the suction inlet 236 of the dust separating unit 230 is aligned with the suction inlet 218 of the collector body 210.

The suction inlet 236 is formed in a tangential direction of the first cyclone unit 231 so that air sucked into the first cyclone unit 231 through the suction inlet 236 can be swirled along an inner surface of the first cyclone unit 231. Similarly, the suction inlet 218 of the collector body 210 is formed in a tangential direction of the first cyclone unit 231.

The dust guide passage 240 is shaped such that dust separated in the first cyclone unit 231 enters the dust guide passage 240 in a tangential direction of the first cyclone unit 231 and then leaves the dust guide passage 240 in a downward direction. The dust guide passage 240 will be described later in more detail with reference to the accompanying drawing.

The dust separating unit 230 is coupled to a bottom portion of the cover member 270 such that the dust separating unit 230 can be detached from the collector body 210 together with the cover member 270 when dust collected in the collector body 210 is removed.

Meanwhile, as described above, the cover member 270 is detachably coupled to the upper portion of the collector body 210. That is, the cover member 270 can close or open both the first and second dust storages 214 and 216.

The dust separating unit 230 is coupled to the bottom portion of the cover member 270. Alternatively, the dust separating unit 230 can be formed integral with the cover member 270.

The cover member 270 includes an air discharge hole 272 through which air is discharged after dust is separated from the air in the first cyclone unit 231. An upper end of a filter member 250 is coupled to the air discharge hole 272. The filter member 250 includes a number of penetration holes 252.

Therefore, after dust is first separated from air in the first cyclone unit 231, the air is discharged from the first cyclone unit 231 through the filter member 250 and the air discharge hole 272.

The cover member 270 further includes a dust inlet 274 to allow an inflow of dust separated in the second cyclone unit 300. The cover member 270 further includes a dust outlet 276 formed in a lower portion to discharge dust from the dust inlet 274 to the second storage 216.

Hereinafter, the dust separating unit 230 characterizing the present invention will be described in more detail.

Figure 5:
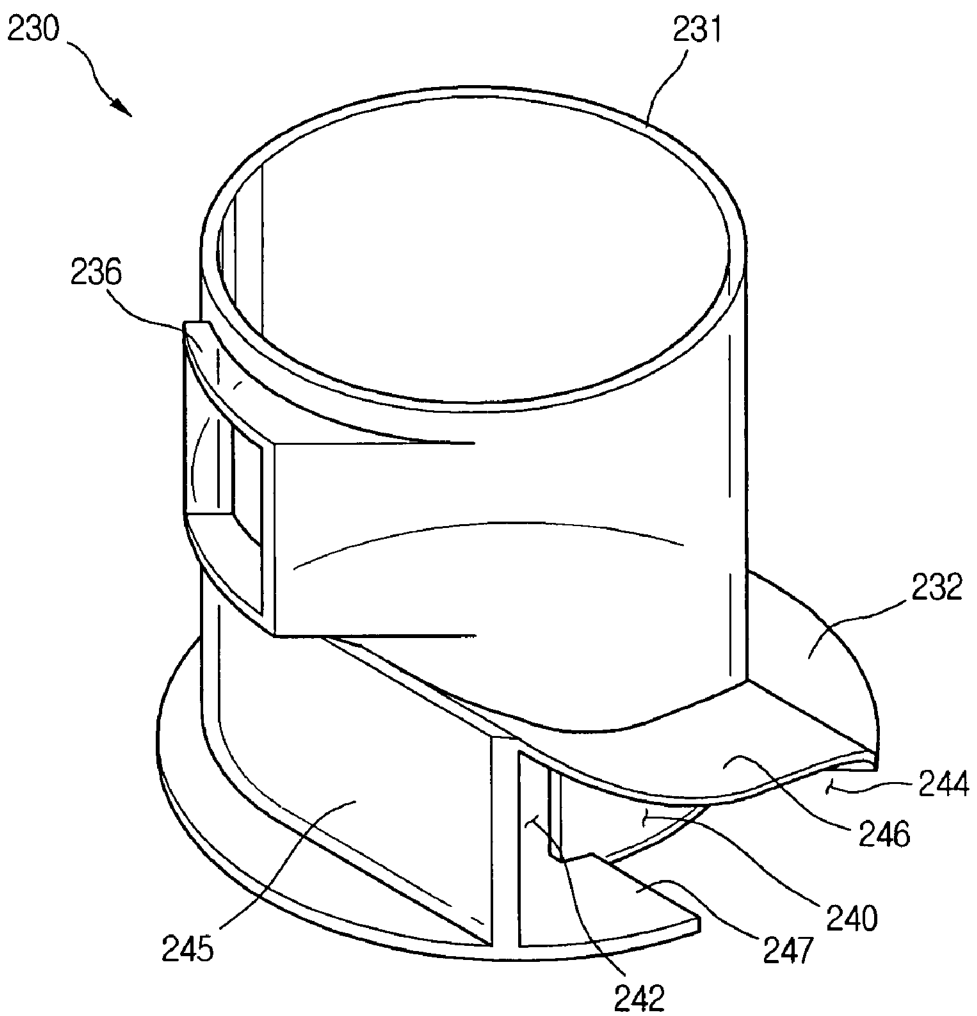
FIGS. 5 and 6 are perspective views illustrating a dust separating unit according to an embodiment of the present invention.
Figure 6:
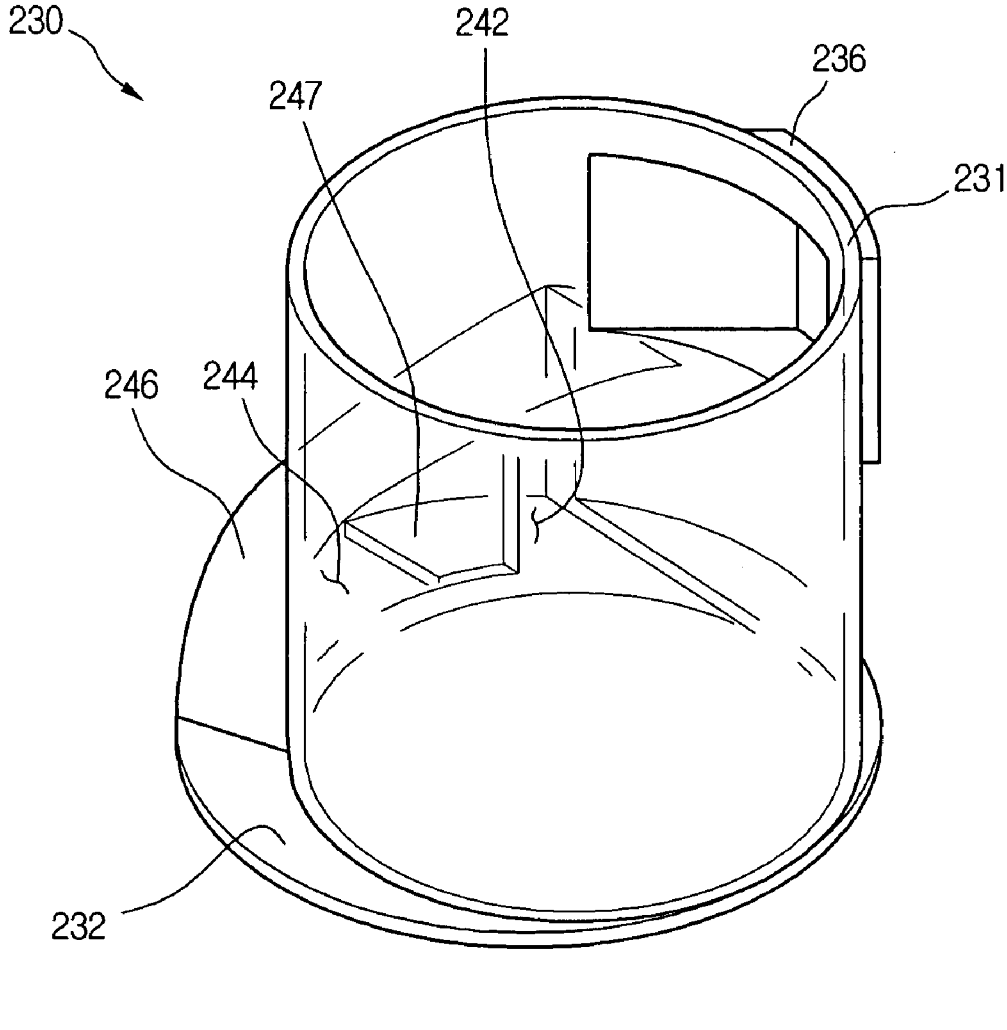
Figure 7:
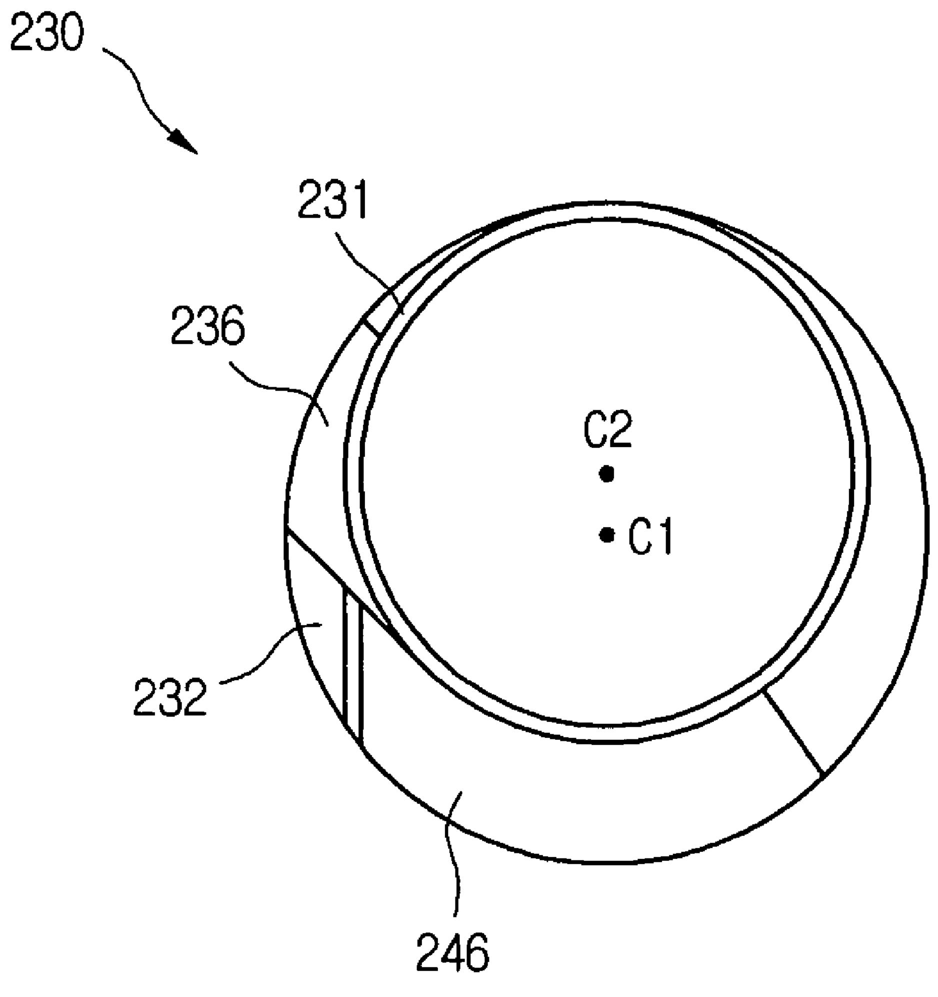
FIG. 7 is a plan view of the dust separating unit.

FIGS. 5 and 6 are perspective views illustrating the dust separating unit 230 according to an embodiment of the present invention, and FIG. 7 is a plan view of the dust separating unit 230.

Referring to FIGS. 5 through 7, the dust separating unit 230 according to the current embodiment is used to first separate dust from sucked air.

In detail, after the dust separating unit 230 is coupled with the cover member 270, the dust separating unit 230 is disposed in the first dust storage 214. The dust separating unit 230 includes the first cyclone unit 231 and a bottom portion 232. In the first cyclone unit 231, dust is separated from air by a cyclone flow.

In more detail, the first cyclone unit 231 has a cylindrical shape, and sucked air is swirled along the inner surface of the first cyclone unit 231. The suction inlet 236 is formed at an upper portion of the first cyclone unit 231 to allow an inflow of air. As described above, the suction inlet 236 is formed in a tangential direction of the first cyclone unit 231.

Therefore, air is sucked into the first cyclone unit 231 through the suction inlet 236 in a tangential direction of the first cyclone unit 231. Then, the air moves downward while it swirls along the inner surface of the first cyclone unit 231. In this process, different centrifugal forces are applied to the air and dust contained in the air since the densities of the air and dust are different, and thus the dust can be separated from the air.

The bottom portion 232 has a circular shape. The outer diameter of the bottom portion 232 corresponds to the inner diameter of the first dust storage 214. In detail, the outer diameter of the bottom portion 232 corresponds to the inner diameter of the upper portion of the first dust storage 214 located above the vent portion 219.

The outer diameter of the bottom portion 232 is larger than that of the first cyclone unit 231. A center C2 of the first cyclone unit 231 is not aligned with a center C1 of the bottom portion 232 as shown in FIG. 7. In detail, the first cyclone unit 231 and the bottom portion 232 are internally tangent. In this case, the dust guide passage 240 can have a sufficient width for smooth flow of dust.

The dust separating unit 230 further includes the dust guide passage 240. Dust separated in the first cyclone unit 231 enters the dust guide passage 240 in a tangential direction of the first cyclone unit 231 and leaves the dust guide passage 240 in a downward direction.

In other words, the dust guide passage 240 guides dust separated in the first cyclone unit 231 such that the dust can be discharged from the first cyclone unit 231 in a tangential direction.

In detail, the dust guide passage 240 includes an inlet 242 formed at a lower portion of the first cyclone unit 231, and an outlet 244 formed through the bottom portion 232.

The inlet 242 and the outlet 244 have approximately the same size such that dust can smoothly pass through the inlet 242 and the outlet 244.

A guide rib 245 is formed at the inlet 242 to guide dust from the first cyclone unit 231 to the dust guide passage 240 in a tangential direction of the first cyclone unit 231. The guide rib 245 extends outward from the first cyclone unit 231 to an edge of the bottom portion 232 in a tangential direction of the first cyclone unit 231.

A top portion 246 extends perpendicular to an outer surface of the first cyclone unit 231 between the guide rib 245 and an end of the outlet 244 to form the top of the dust guide passage 240.

The width of the dust guide passage 240 is determined by the width of the top portion 246. As described above, since the first cyclone unit 231 and the bottom portion 232 are eccentric to each other, the dust guide passage 240 can have a sufficiently large width such that a relatively large dust clump can pass through the dust guide passage 240.

The top portion 246 of the dust guide passage 240 is curved downward from the inlet 242 to the outlet 244 so that dust can smoothly flow through the dust guide passage 240.

Since the top portion 246 is downwardly curved, the cross-sectional area of the dust guide passage 240 decreases as it goes from the inlet 242 to the outlet 244.

Here, although the cross-sectional area of the dust guide passage 240 decreases as it goes from the inlet 242 to the outlet 244, dust can be smoothly discharged through the outlet 244 since the outlet 244 is downwardly formed.

Owing to the above-mentioned structure, dust separated from air in the first cyclone unit 231 is discharged to the dust guide passage 240 in a tangential direction of the first cyclone unit 231. In the dust guide passage 240, the flow of the dust is bent and then guided along an outer surface of the first cyclone unit 231. Thereafter, the dust is moved down to the first dust storage 214 through the outlet 244.

Therefore, since dust separated in the first cyclone unit 231 is discharged from the tangential direction of the first cyclone unit 231 (i.e., dust is discharged in the same direction as the swirling direction of the dust), both heavy and light dust particles can be easily discharged from the first cyclone unit 231.

Furthermore, light dust particles are not accumulated on the filter member 250 since the light dust particles are easily discharged. Thus, air can smoothly flow through the filter member 250, and therefore dust separating efficiency increases.

In addition, the movement direction of dust changes in the dust guide passage 240, and then the dust is discharged to the first dust storage 214 from the dust guide passage 240. Therefore, the dust stored in the first dust storage 214 is not readily scattered back to the first cyclone unit 231.

In other words, since dust should move from the first dust storage 214 to the dust guide passage 240 in a direction opposite to the direction of dust moving from the first cyclone unit 231 to the dust guide passage 240, the dust stored in the first dust storage 214 is not readily scattered back to the first cyclone unit 231.

A backward flow prevention rib 247 is horizontally formed on an end of the inlet 242 of the dust guide passage 240 to prevent a backward flow of the dust stored in the first dust storage 214 more effectively. That is, the backward flow prevention rib 247 spaces the inlet 242 away from the outlet 244 by a predetermined distance.

Hereinafter, it will be described how air and dust flow in the dust collector 200.

Figure 8:
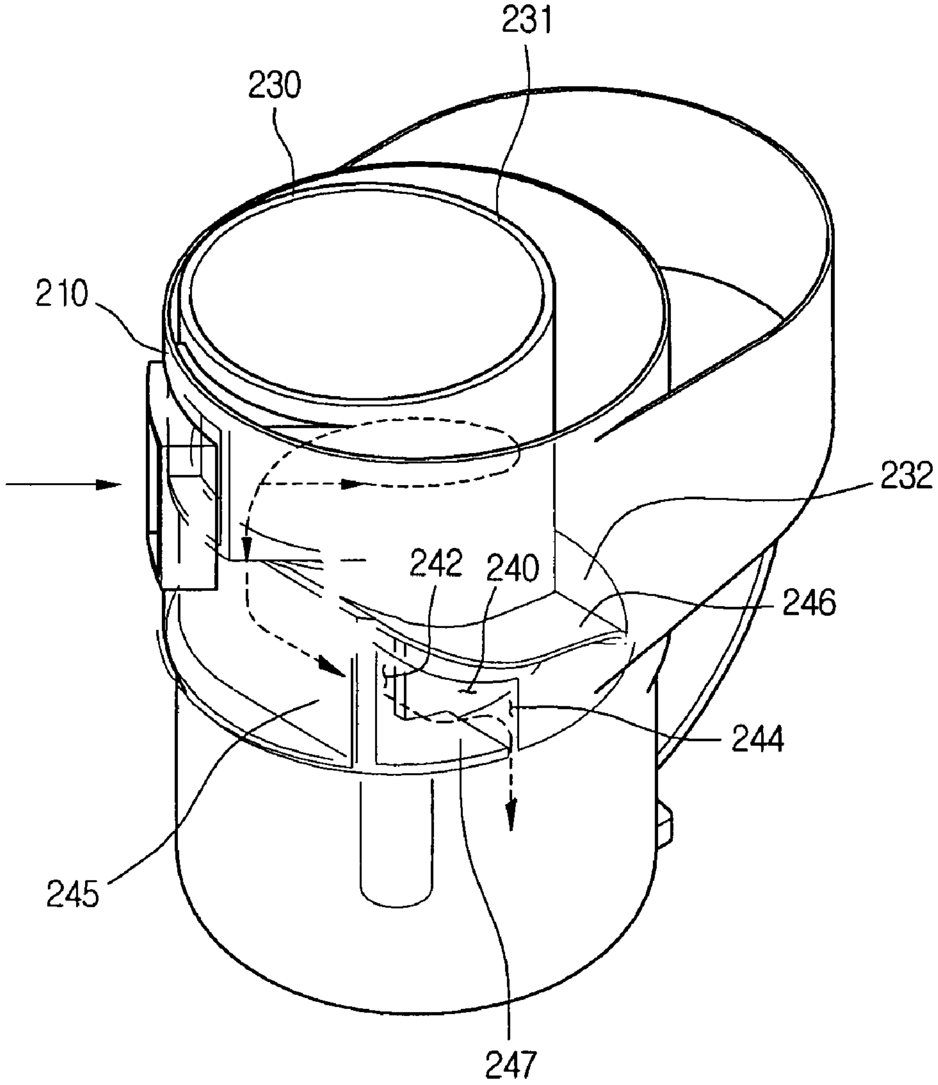
FIG. 8 is a perspective view for explaining how dust flows in the dust collector according to an embodiment of the present invention.

FIG. 8 is a perspective view for explaining how dust flows in the dust collector 200 according to an embodiment of the present invention.

Referring to FIG. 8, air containing dust is sucked through the suction nozzle and flows along an inner passage of the main body 100. Then, the air containing dust is sucked into the dust collector 200.

In detail, the air containing dust passes through the suction inlet 218 of the collector body 210 and the suction inlet 236 of the first cyclone unit 231 and is sucked into the first cyclone unit 231 in a tangential direction of the first cyclone unit 231. In the first cyclone unit 231, the air swirls down along the inner surface of the first cyclone unit 231. In this process, dust contained in the air is separated from the air since different centrifugal forces are applied to the air and dust due to different densities of the air and dust.

After the dust is separated from the air, the air is filtered while passing through the penetration holes 252 of the filter member 250. Then, the air is discharged from the dust collector 200 through the air discharge hole 272.

Meanwhile, the dust separated from the air swirls down along the inner surface of the first cyclone unit 231 and is introduced into the dust guide passage 240 in a tangential direction of the first cyclone unit 231.

Here, relatively heavy dust particles are easily discharged to the dust guide passage 240 since the heavy dust particles can swirl down until it reaches the inlet 242 of the dust guide passage 240 owing to the guide rib 245.

Meanwhile, although light dust particles are not easily moved down to the dust guide passage 240 by gravity, the light dust particles can be easily discharged to the dust guide passage 240 since the light dust particles can swirl down to the inlet 242 of the dust guide passage 240 owing to the guide rib 245.

In the dust guide passage 240, the movement direction of the dust is changed, and then the dust flows along an outer surface of the first cyclone unit 231. Thereafter, the dust is moved down to the first dust storage 214 through the outlet 244 of the dust guide passage 240.

Meanwhile, the air discharged from the dust collector 200 through the air discharge hole 272 is guided back to the main body 100. In the main body 100, the air flows to the second cyclone unit 300 through the communication passage formed between the dust collector 200 and the second cyclone unit 300. In the second cyclone unit 300, dust is further separated from the air.

Thereafter, the air is guided back to the main body 100 and is discharged to the outside of the vacuum cleaner 10 through the discharge port formed in the main body 100.

On the other hand, the dust separated from the air in the second cyclone unit 300 is sent to the dust collector 200 through the dust inlet 274 and the dust outlet 276. Then, the dust is stored in the second dust storage 216 of the dust collector 200.

Figure 9:
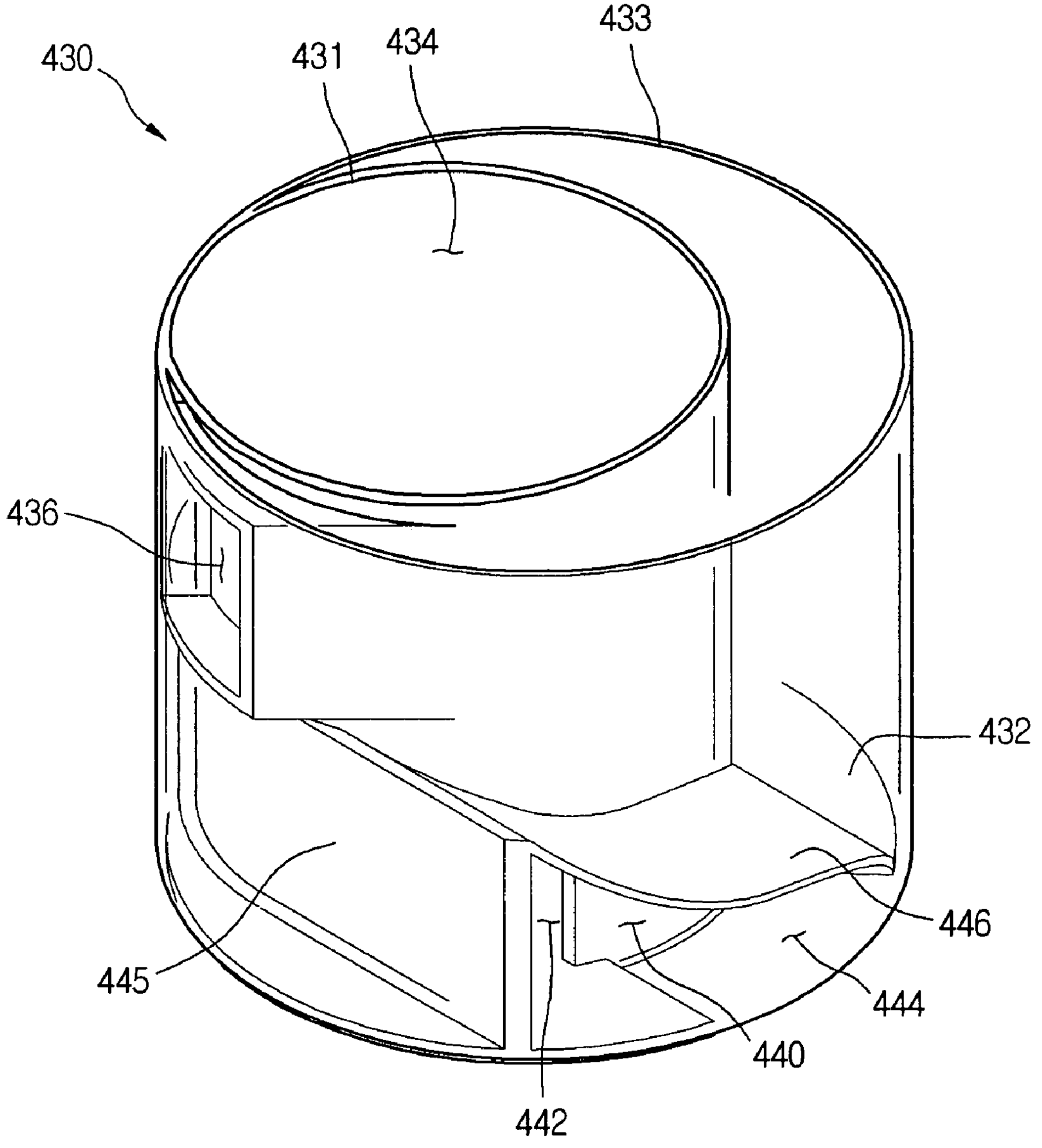
FIG. 9 is a perspective view illustrating a dust separating unit according to another embodiment of the present invention.

FIG. 9 is a perspective view illustrating a dust separating unit 430 according to another embodiment of the present invention.

The dust separating unit 430 of the current embodiment has the same structure as the dust separating unit 230 of the previous embodiment, except for an additional wall formed on an outside of a first cyclone unit. Thus, descriptions of the same elements as those in the present invention embodiment will be omitted.

Referring to FIG. 9, the dust separating unit 430 includes an outer wall 433 forming the exterior of the dust separating unit 430, an eccentric inner wall 431 to the outer wall 433 for separating dust from sucked air, and a bottom portion 432 forming the bottom of the dust separating unit 430. The inner wall 431 forms a first cyclone unit in which dust is separated from sucked air by a cyclone motion.

In detail, the outer wall 433 has a size corresponding to the inner diameter of the collector body 210. The dust separating unit 430 further includes a suction inlet 436 allowing an inflow of air containing dust. The suction inlet 436 is formed from the outer wall 433 to the inner wall 431. Furthermore, the suction inlet 436 is formed in a tangential direction of the inner wall 431.

An inlet 442 of a dust guide passage 440 is formed at the inner wall 431, and an outlet 444 of the dust guide passage 440 is formed at the bottom portion 432. Therefore, dust introduced into the dust guide passage 440 is guided by an outer surface of the inner wall 431 and an inner surface of the outer wall 433.

A guide rib 445 is formed at the inlet 442 of the dust guide passage 440 to guide dust from the first cyclone unit to the dust guide passage 440 in a tangential direction of the first cyclone unit. The guide rib 445 extends from an end of the inlet 442 to the outer wall 433 in a tangential direction of the inner wall 431.

A top portion 446 of the dust guide passage 440 extends from the guide rib 445 to an end of the outlet 444. The top portion 446 is perpendicular to the inner wall 431 and the outer wall 433 and is downwardly curved from the inlet 442 to the outlet 444.

The outer wall 433 guides a flow of dust and is used to improve the aesthetical appearance of the dust separating unit 430.

The dust separating unit 430 is coupled to the cover member 270 as described in the previous embodiment. Thus, when the cover member 270 is detached from the collector body 210, the dust separating unit 430 is detached from the collector body together with the cover member 270. In this case, the dust separating unit 430 is directly exposed to the outside.

Since the cylindrical outer wall 433 is provided for the dust separating unit 430, the dust separating unit 430 can have a simple and beautiful appearance owing to the outer wall 433. Furthermore, the inner structure of the dust separating unit 430 is not directly exposed to the outside owing the outer wall 433.

In addition, since the outer wall 433 encloses the dust separating unit 430, a user can be prevented from being injured by, for example, the guide rib 445 or the top portion 446 of the dust guide passage 440 when the user detaches the dust separating unit 430 from the collector body 210.

Figure 10:
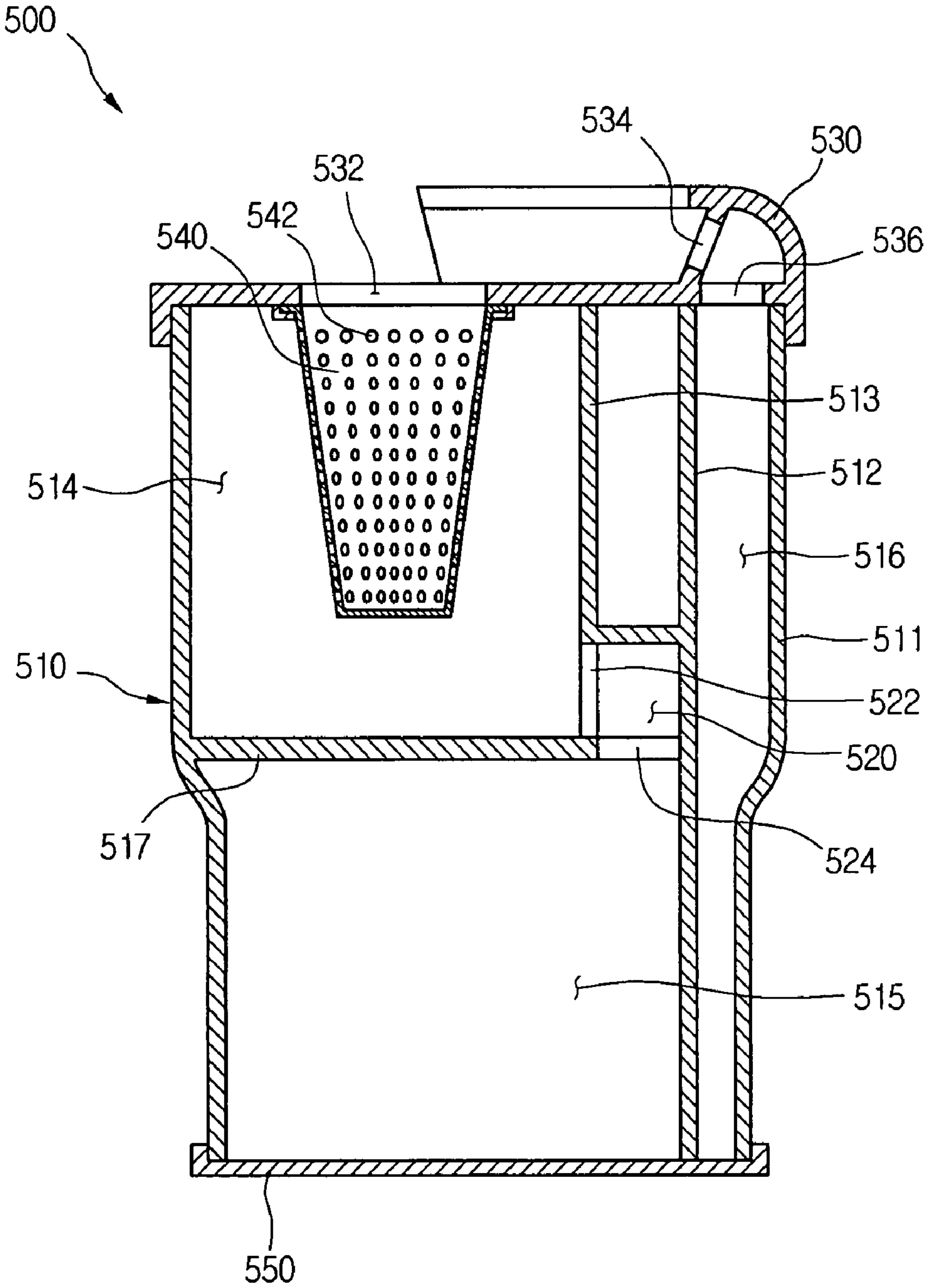
FIG. 10 is a cross-sectional view illustrating a dust collector according to another embodiment of the present invention.

FIG. 10 is a cross-sectional view illustrating a dust collector 500 according to another embodiment of the present invention.

The dust collector 500 of the current embodiment has the same structure as the dust collector 200 of the previous embodiment except that a dust separating unit and a collector body are formed in one piece. Thus, descriptions of the same elements as those in the previous embodiment will be omitted.

Referring to FIG. 10, the dust collector 500 includes a collector body 510 forming the exterior of the dust collector 500, a dust separating unit 514 formed in an upper portion of the collector body 510 for separating dust from sucked air, a first dust storage 515 formed under the dust separating unit 514 for storing the dust separated by the dust separating unit 514, a cover member 530 for selectively closing a top portion of the collector body 510, and a lower cover 550 for selectively closing a bottom portion of the collector body 510.

In detail, the collector body 510 is divided into upper and lower compartments by a barrier wall 517. The dust separating unit 514 is formed in the upper compartment, and the first dust storage 515 is formed in the lower compartment.

The dust separating unit 514 is formed between an outer wall 511 and an inner wall 513 of the collector body 510. The barrier wall 517 separates the dust separating unit 514 from the first dust storage 515 and prevents dust stored in the first dust storage 515 from scattering back to the dust separating unit 514.

A middle wall 512 is formed between the inner wall 513 and the outer wall 511 of the collector body 510. A second dust storage 516 is formed between the middle wall 512 and the outer wall 511 to store dust separated by the second cyclone unit 300.

Therefore, in the collector body 510, the dust separating unit 514 and the first and second dust storages 515 and 516 are formed by the inner wall 513, the middle wall 512, the outer wall 511, and the barrier wall 517.

Meanwhile, a dust guide passage 520 is formed between the dust separating unit 514 and the first dust storage 515 through the barrier wall 517, so that the dust separating unit 514 can communicate with the first dust storage 515.

In detail, the dust guide passage 520 is formed at an outer portion of the dust separating unit 514 to guide dust separated in the dust separating unit 514 to the first dust storage 515 in a tangential direction of the dust separating unit 514. For this, the dust guide passage 520 includes an inlet 522 formed at a side portion of the dust separating unit 514 and an outlet 524 formed at the barrier wall 517.

Therefore, dust separated from air in the dust separating unit 514 can be guided (discharged) to the dust guide passage 520 in a tangential direction of the dust separating unit 514. Then, the dust flows down to the first dust storage 515 along the dust guide passage 520.

Meanwhile, the cover member 530 is detachably coupled to the top portion of the collector body 510. That is, the cover member 530 can close or open the dust separating unit 514 and the second dust storage 516 at the same time.

The cover member 530 includes an air discharge hole 532 through which air is discharged to the outside of the dust collector 500 after dust is separated from the air in the dust separating unit 514. An upper end of a filter member 540 is coupled to an edge of the air discharge hole 532. A number of penetration holes 542 are formed through the filter member 540.

The cover member 530 further includes a dust inlet 534 allowing an inflow of dust separated by the second cyclone unit 300. The cover member 530 further includes a dust outlet 536 at a lower portion to discharge the dust introduced through the dust inlet 534 to the second dust storage 516.

Meanwhile, the lower cover 550 is detachably coupled to the lower portion of the collector body 510. The lower cover 550 can open or close the first and second dust storages 515 and 516 at the same time. Therefore, dust stored in the first and second dust storages 515 and 516 can be removed at the same time by opening the lower cover 550.

Here, dust stored in the second dust storage 516 can be removed after opening one of the cover member 530 and the lower cover 550.

According to the current embodiment, when the cover member 530 is opened, the structures of the dust separating unit 514 and the dust guide passage are not exposed to the outside, thereby improving the aesthetic appearance of the dust collector 500. Furthermore, dust stored in the first and second dust storages 515 and 516 can be easily removed after opening only the lower cover 550.

In addition, the second dust storage 516 has opened top and bottom portions so that the collector body 510 can be easily cleaned.

Although the embodiments of the present invention are described about canister type vacuum cleaners, the present invention can be applied to other types of vacuum cleaners such as an upright type vacuum cleaner and a robot cleaner.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A dust collector of a vacuum cleaner, comprising:

a dust separating unit including a cyclone unit that defines a separation space for separating dust from air;

a collector body having a dust storage formed therein for storing the dust separated in the cyclone unit; and a dust guide passage formed at an outside of the separation space, wherein the dust guide passage connects the separation space to the dust storage and guides the separated dust for discharge from the separation space, wherein an outer surface of the cyclone unit defines at least a side portion of the dust guide passage.

2. The dust collector according to claim 1, wherein the dust separating unit comprises a bottom portion forming a bottom of the cyclone unit.

3. The dust collector according to claim 1, wherein the dust separating unit comprises:

an outer wall having a size corresponding to that of the collector body; and a bottom portion connecting the cyclone unit to the outer wall, wherein the dust guide passage is formed between the cyclone unit and the outer wall.

4. The dust collector according to claim 2, wherein the dust separated in the separation space is introduced into the dust guide passage from a side portion of the dust guide passage and is discharged downward from the dust guide passage.

5. The dust collector according to claim 2, wherein the dust guide passage comprises:

an inlet formed at a side portion of the cyclone unit of the dust separating unit; and an outlet formed at the bottom portion of the dust separating unit.

6. The dust collector according to claim 2, wherein the bottom portion has a diameter larger than that of the cyclone unit.

7. The dust collector according to claim 2, wherein the cyclone unit and the bottom portion are eccentric to each other.

8. The dust collector according to claim 5, wherein the dust guide passage further comprises a guide rib formed at the inlet in a tangential direction of the cyclone unit for guiding a flow of dust in the tangential direction.

9. The dust collector according to claim 5, wherein the dust guide passage further comprises a top portion downwardly curved from the inlet to the outlet.

10. The dust collector according to claim 5, wherein a cross-sectional area of the dust guide passage decreases from the inlet to the outlet.

11. The dust collector according to claim 5, wherein the dust guide passage further comprises a backward flow prevention rib extending horizontally from an end of the inlet for preventing a backward flow of the dust stored in the dust storage.

12. The dust collector according to claim 1, wherein the collector body comprises a barrier wall for separating the dust storage from the separation space.

13. A dust collector of a vacuum cleaner, comprising:

a dust separating unit having a separation space formed therein for separating dust from air;

a collector body having a dust storage formed therein for storing the dust separated in the separation space, wherein the dust separating unit is removably positioned in the collector body; and a dust guide passage formed at an outside of the separation space for guiding the separated dust to the dust storage, wherein the collector body defines a side portion of the dust guide passage when the separating unit is positioned in the collector body.

14. The dust collector according to claim 13, wherein the dust separated in the separation space is discharged to the dust guide passage in a tangential direction of the dust separation space.

15. The dust collector according to claim 14, wherein the dust separating unit comprises:

a cyclone unit forming the separation space; and a bottom portion forming a bottom of the dust separating unit.

16. The dust collector according to claim 15, wherein the dust guide passage comprises:

an inlet formed at a side portion of the cyclone unit of the dust separating unit; and an outlet formed at the bottom portion of the dust separating unit.

17. The dust collector according to claim 16, wherein the outlet of the dust guide passage is formed at an outside of the cyclone unit.

18. The dust collector according to claim 13, further comprising a cover member coupled to a top portion of the dust separating unit, the cover member selectively opening and closing a top portion of the collector body.

19. A dust collector of a vacuum cleaner, comprising:

a dust separating unit including a cyclone unit that forms a separation space for separating dust from air;

a collector body that having a dust storage formed therein for storing the dust separated in the dust separating unit; and a dust guide passage that connects the separation space to the dust storage and that guides the separated dust for discharge from the separation space, wherein the dust guide passage comprises:

an inlet formed at a side portion of the cyclone unit of the dust separating unit;

an outlet in fluid communication with the inlet; and a backward flow prevention rib extending horizontally from an end of the inlet so as to prevent a backward flow of the dust stored in the dust storage, wherein the backward flow prevention rib defines a lower portion of the dust guide passage.

20. The dust collector according to claim 19, wherein the dust separating unit is selectively accommodated in the collector body, and the collector body defines a side portion of the dust guide passage when the dust separating unit is accommodated in the collector body.

21. The dust collector according to claim 19, wherein an outer surface of the cyclone unit defines at least a side portion of the dust guide passage.

* * * * *